US009071902B1

(12) United States Patent
Ai

(10) Patent No.: US 9,071,902 B1
(45) Date of Patent: Jun. 30, 2015

(54) MOBILE PHONE CASE WITH RETRACTABLE HEADSET

(71) Applicant: Chunbing Ai, Shenzhen (CN)

(72) Inventor: Chunbing Ai, Shenzhen (CN)

( * ) Notice: Subject to any disclaimer, the term of this patent is extended or adjusted under 35 U.S.C. 154(b) by 0 days.

(21) Appl. No.: 14/549,919

(22) Filed: Nov. 21, 2014

(30) Foreign Application Priority Data

May 28, 2014 (CN) ...................... 2014 2 0279428 U

(51) Int. Cl.
*H04R 1/10* (2006.01)
(52) U.S. Cl.
CPC .................................... *H04R 1/1033* (2013.01)
(58) Field of Classification Search
CPC .... H04R 1/10; H04R 2205/022; H04R 1/105; H04R 5/0335; H04R 2201/10
USPC .................. 381/370–371, 374, 379, 383–384
See application file for complete search history.

(56) References Cited

U.S. PATENT DOCUMENTS

| 8,800,907 B2* | 8/2014 | Koenig et al. ................. 381/370 |
| 2001/0035242 A1 | 11/2001 | Hughs | |
| 2008/0080732 A1* | 4/2008 | Sneed ............................ 381/370 |
| 2013/0129138 A1* | 5/2013 | Washington, Jr. ............. 381/384 |
| 2014/0314266 A1* | 10/2014 | Kroupa ......................... 381/384 |

* cited by examiner

*Primary Examiner* — Suhan Ni
(74) *Attorney, Agent, or Firm* — Timothy Wang; Ni, Wang & Massand

(57) ABSTRACT

A phone case with a retractable headset integrated thereof includes a removable housing, a headset with two earbuds, and a cord for the headset with a pair of free ends and a plug. The housing includes a wire storage slot for the earbud cord, and the wire storage slot includes a spring-loaded reel for automatic retracting of the cord when not used. It further includes an earbud storage slot with an opening at one edge of the housing for storing the earbuds; a plug storage slot with an opening at another edge of the housing for storing the plug close to the headset jack of a mobile phone; and the wire storage slot, earbud storage slot, and plug storage slot are interconnected via said headset cord. A plurality of wheels are positioned inside the case for routing the headset cord through the earbud storage slot, wire storage slot, and plug storage slot. The headset is integrated with the housing with earbuds retractably stored in said earbud storage slot and said headset cord stored in said wire storage slot and plug storage slot.

12 Claims, 16 Drawing Sheets

MOBILE PHONE CASE WITH RETRACTABLE HEADSET

BACKGROUND OF THE INVENTION

The inventions disclosed herein generally relate to mobile plume cases. More specifically, they relates to a mobile phone case with an integrated retractable headset, and optionally a rechargeable battery with a matching charge cable.

Mobile phones, especially smart phones are the most frequently used consumer electronics nowadays. A headset is often a necessary accessory as the cell phone owner uses it to listen to calls, music or movies stored or streamed to the phone in a quiet and enjoyable fashion. The headset is usually carried separately from the phone itself. For a headset with a cord, it is often a hassle as the wire could become intertwined when put in a bag or the user's pocket. They are often misplaced as well as people carry the phone around.

To solve the intertwining issue with the cord and occasional misplacement problem, some has proposed a headset with retractable and extendable cord. Such a headset rolls the cord around a spring, loaded reel. By pulling the cord from both sides of the reel, it solves the intertwining hassle to some extent. But such a standalone retractable headset has its own problems. The earbuds and plug, cord are typically exposed and prone to scratch the phone when stored together in a bag or pocket. Additionally the storage box for such headset could also scratch the phone. If stored separately from the phone, such a headset is prone to being misplaced or lost. The storage boxes are frequently cumbersome and can make the user's ears uncomfortable or accidentally pull out the earbud while the headset is in use. Wireless headsets, such as the Bluetooth-enabled headsets, do not have the intertwining cord problem, but their size is generally bigger and prone to being misplaced or lost as well.

Others have invented cell phone cases with integrated headset. One is disclosed in U.S. Patent Pub. No. 20010035242 filed by Hughs et al. However, the design in Hughs requires a replaceable storage box on the back of the cell phone case. It essentially attaches a storage box with a retractable headset. Such a design is artistically undesirable and adds additional weight, and makes it less comfortable to carry the phone case.

Yet in another design disclosed in U.S. Patent Pub. No. 20130129138 filed by Washington. The headset in Washington is not truly an integral part of the case. The earbuds are hanging out of the case through a hole with the cord attached to a ratcheted reel in the case. Again, it appears to be artistically undesirable and makes the earbuds prone to be scratched or even cut off from the case.

In sum, innovative solutions are needed to solve these issues and shortcomings with current designs of retractable or integrated headset for mobile phones.

SUMMARY

The mobile phone case designs disclosed herein provides a phone case that not only protects the phone from scratches but also fully integrates a headset as part of the case without creating additional structures outside of or attached to the case. It provides a fully integrated case that is artistically desirable and easy to carry with no additional burden to the user.

One objective of the present inventions is to provide a phone case with a retractable headset integrated thereof that includes a removable housing, a headset with two earbuds, and a cord for the headset with a pair of free ends and a plug. The housing includes a wire storage slot for the earbud cord, and the wire storage slot includes a spring-loaded reel for automatic retracting, of the cord when not used. It further includes a pair of earbud storage slots with an opening at one edge of the housing for storing the earbuds; a plug storage slot with an opening at another edge of the housing for storing the plug close to the headset jack of a mobile phone; and the wire storage slot, earbud storage slot, and plug storage slot are interconnected via said headset cord. A plurality of wheels are positioned inside the case for retractably routing the headset cord through the earbud storage slot, wire storage slot, and plug storage slot. The headset is integrated with the housing with earbuds retractably stored in said earbud storage slot and said headset cord stored in said wire storage slot and plug storage slot.

Another objective of the present inventions is to provide a removable housing having a top and a bottom portion that attach and detach from one another. The wire storage slot is preferably located close to the center intersection between the top and bottom housing portions. And the earbud storage slot is compatible with the shape of the earbud and said plug storage slot is compatible with the shape of the headset plug.

Another objective of the present inventions is to provide a pair of earbuds with the left earbud and right earbud detachably hooked together with flat top and bottom surfaces.

Another objective of the present inventions is to provide good and lightweight earbuds with a receiver and a base. The base for one of the earbuds is a flat-shaped plate while the base for the other earbud is a flat-shaped frame that matches said plate so that the two bases can be detachably hooked together to form an integrated flat top and bottom surface.

Another objective of the present inventions is to provide a cord reel which includes a turntable and coil spring for retracting and releasing the headset cord. The turntable is fixed to the inner surface of said top or bottom portions of the case and said coil spring is fixed to said turntable. The headset cord is wound around said turntable for retracting and releasing, and the coil spring tightens or relaxes as the turntable rotates.

A further objective of the present inventions is to provide a turntable that is round-shaped and includes an axial hole with a first shaft wherein said first shaft is fixed perpendicularly to the inner surface of said top or bottom portion of the case. Towards its upper surface, the turntable includes a ball track table that includes a ball track groove and a rolling ball. The turntable further includes an annular ledge on the other surface of said turntable with a coil spring enclosed therein.

Yet another objective of the present inventions is to provide an annular ledge that includes a first hole for holding the headset cord, and a second hole located between said annular ledge and ball track table on said turntable.

Furthermore, another objective of the present inventions is to provide a case that includes a foldable kickstand attached to the outside surface of said bottom portion of the housing.

It is yet another objective of the present inventions to provide a case that also includes a rechargeable battery and die accompanying charging cable. The battery is detachably attached to and stored in the bottom housing portion. The charging cable is connected to the battery at one end and stored in the bottom housing portion. Furthermore, the opposite end of the charging cable ends in a charging adapter for connecting to and recharging the mobile phone.

Figure 1:
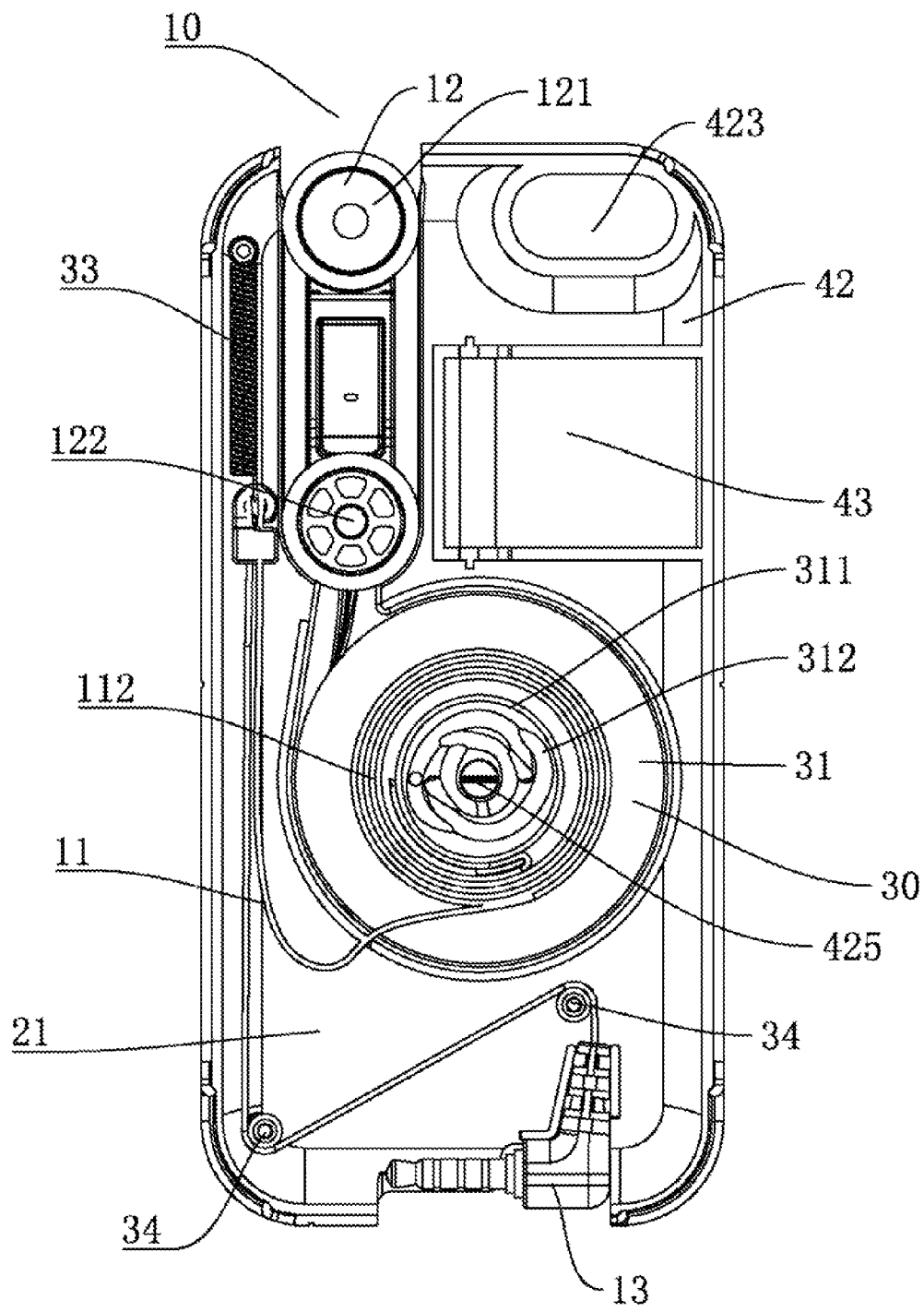
FIG. 1 is the design diagram for the overall structure of one preferred embodiment.

The depicted figures include headset 10, headset cord 11, a first headset cord 111, a second headset cord 112, earbuds 12, left earbud 121, left earbud receiver 1211, left earbud base 1212, right earbud 122, right earbud receiver 1221, right earbud base 1222, right earbud frame 1223, right earbud border 1224, right earbud cord groove 1225, headset cord plug 13, wire storage slot 21, earbud storage slot 22, cord plug storage slot 23, spring-loaded reel assembly 30, turntable 31, ball track table 311, ball track groove 312, rolling ball 313, annular ledge 314, coil spring 32, pullback spring 33, second support pole 34, top housing portion 41, opening for headset cord plug 412, protruding wall for headset cord plug 413, protruding wall of wire storage slot 414, bottom housing portion 42, back panel 421, side frame 422, open holes for camera 413 and 423, opening for earbud 424, first support pole 425, kickstand 43, rechargeable battery 50, and charging cable 51.

DETAILED DESCRIPTION

The following description provides details with reference to the accompanying drawings. It should be understood that the invention may be embodied in many different forms and should not be construed as limited to the embodiments set forth herein.

As shown in FIGS. 1 through 12, the mobile phone case disclosed herein includes a top housing portion 41, bottom housing portion 42, headset 10 and a spring-loaded reel assembly 30.

Figure 4:
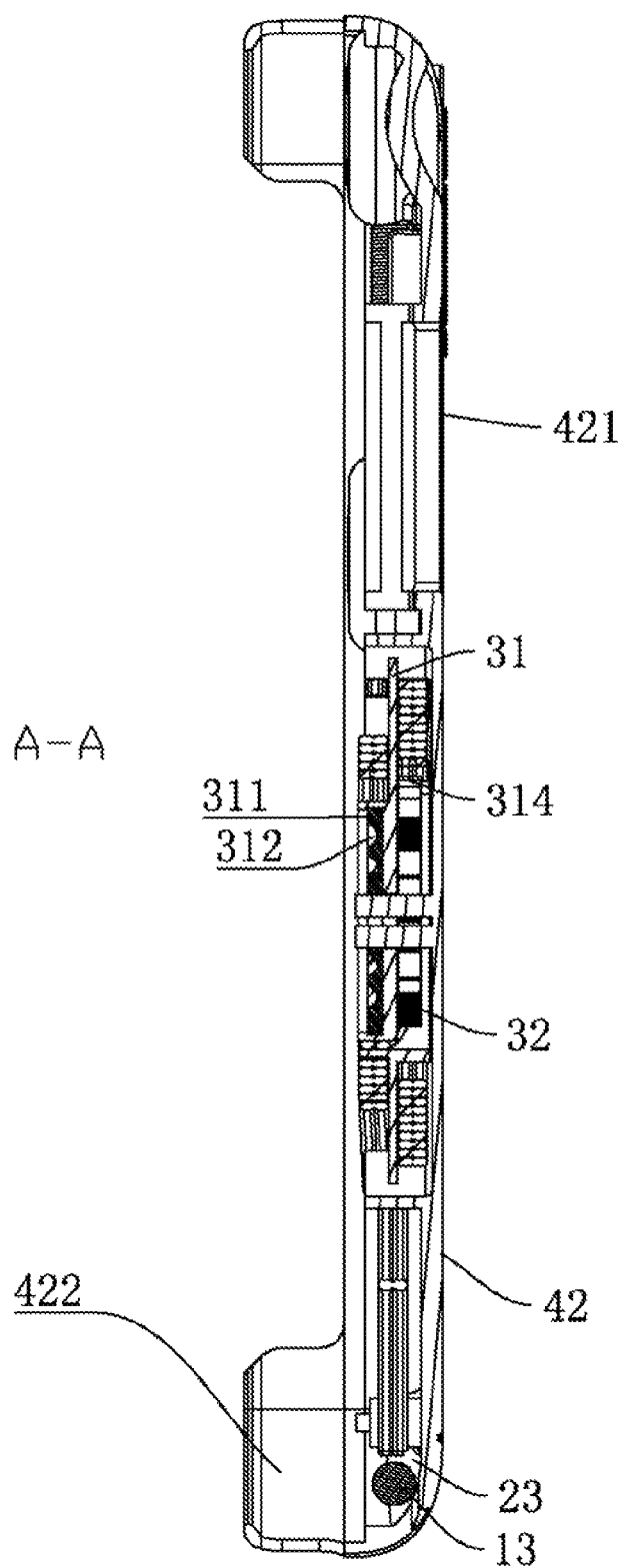
FIG. 4 depicts the cross-section view from the B-B direction of the side view shown in FIG. 2.

The top portion 41 and bottom portion 42 can be attached to form the enclosure for the headset and the retraction assembly. As shown in FIGS. 4-8, the top housing portion 41 is a thin panel with a protruding wall structure along, the edges to securely enclose a mobile phone. The protruding wall structure is shaped to fit a mobile phone. FIG. 4 depicts one preferred embodiment showing a top housing portion with protruding enclosure walls to hold a mobile phone. FIGS. 1-4 show a back portion of a case that includes a back panel 421 and a side frame 422. The back panel is about the same size as the top housing portion 41. The top housing portion can be attached to the bottom housing portion 42 and form the enclosure with the back panel 421.

Figure 2:
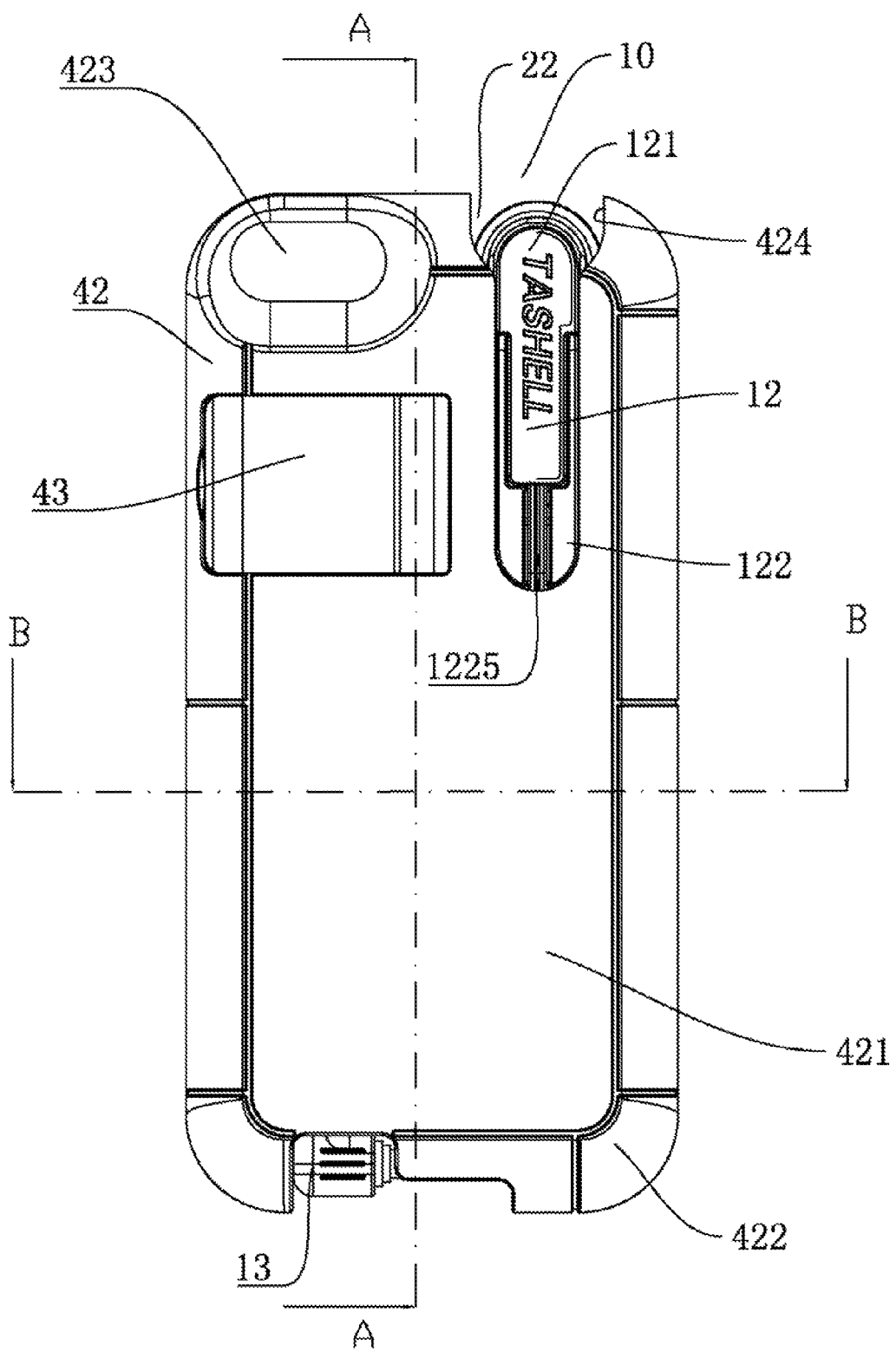
FIG. 2 depicts the side view of one preferred embodiment.
Figure 3:
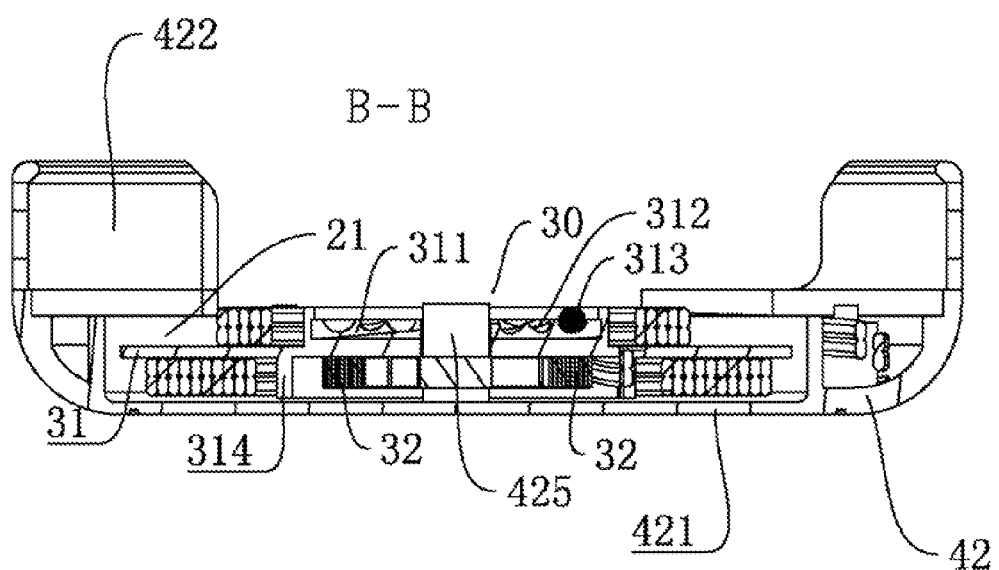
FIG. 3 depicts the cross-section view from the A-A direction of the side view shown in FIG. 2.
Figure 8:
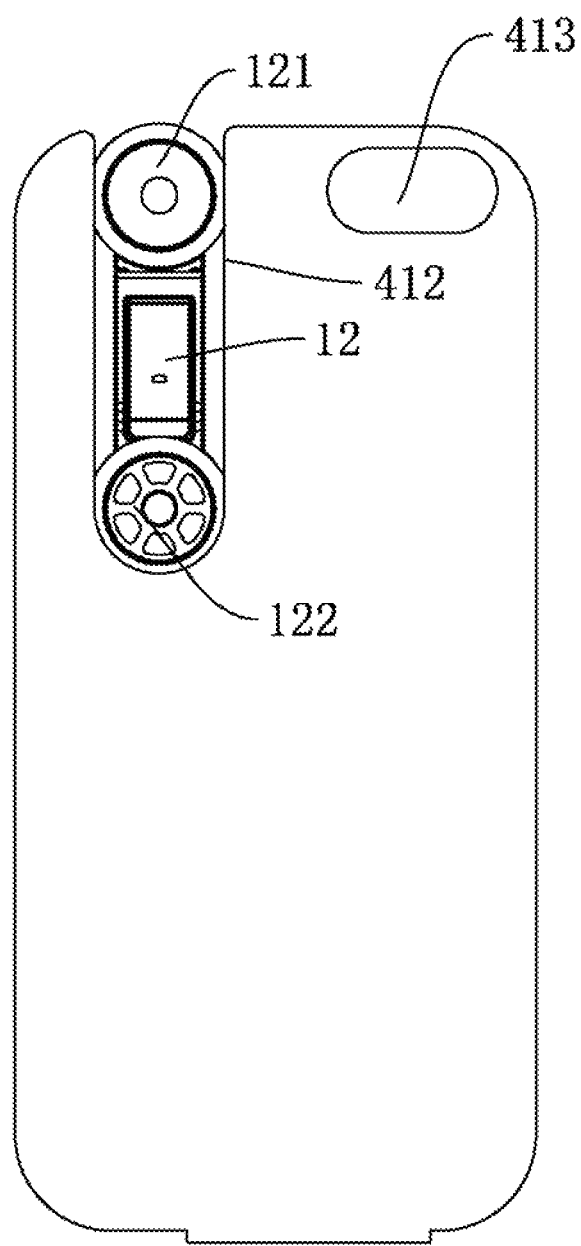
FIG. 8 is the structure diagram of the back portion of one preferred embodiment.
Figure 9:
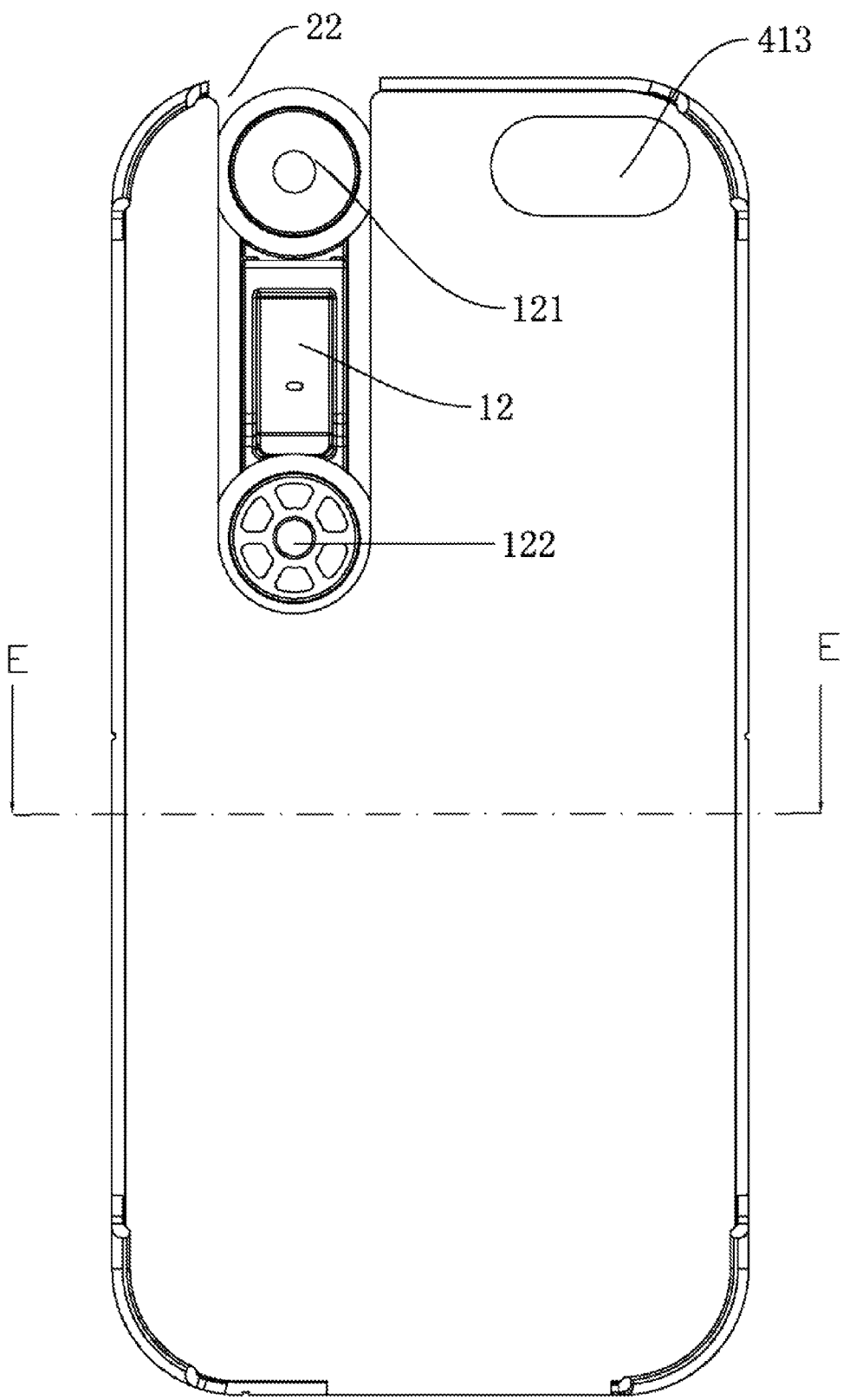
FIG. 9 is the overall structure diagram of one preferred embodiment.
Figure 10:
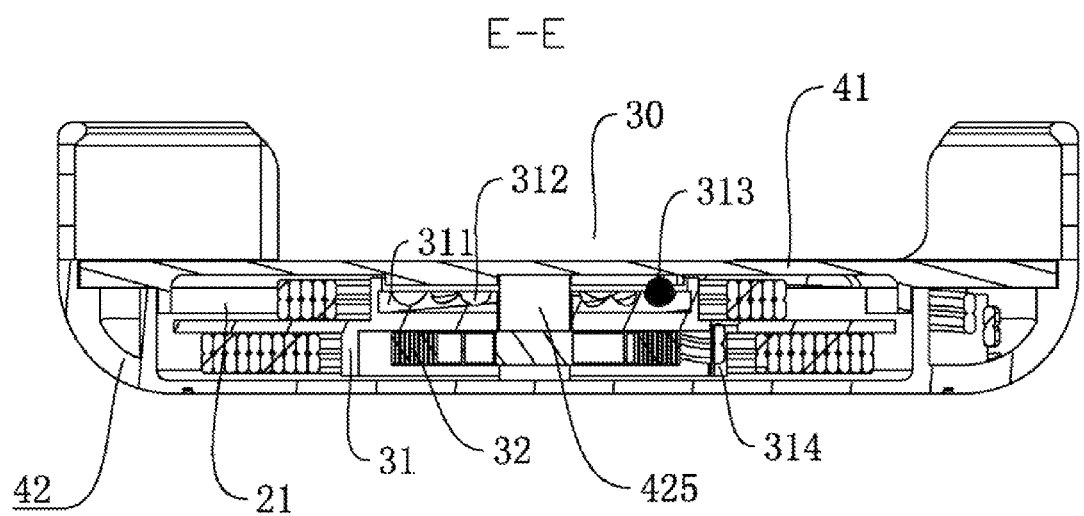
FIG. 10 depicts the cross-section view from the E-E direction as shown in FIG. 9.

As shown in FIGS. 2 and 8, there are openings in the top portion of the case 41 and the back panel 421 that correspond to the location of the camera lens in the mobile phone. In this preferred embodiment, the first opening for earbuds 411 is located in the top portion of the housing while the second opening for earbuds 424 is located in the back panel 421. Both openings match each other in location and are shaped to fit the shape of earbuds 12. A convex wall is mounted vertically along the edge of the first opening 411 towards the back panel 421. The thickness of the convex wall is substantially the same as the thickness of the earbuds 12 so the earbuds can be securely inserted and stored. The space formed by enclosing the first opening 412 and second opening 424 makes the headset storage slot 22.

FIG. 1 shows the overall structure of one preferred embodiment. An opening for headset cord plug 412 is typically located, at the bottom of the housing and close to the earplug hole of a mobile phone. The cord plug opening 412 is shaped to match the headset cord plug 13. A protruding wall 413 is located on the bottom side of the top portion 41 to restrict the cord plug for a more efficient use of the space. The space formed by the protruding wall 413 substantially matches the shape of a cord plug 13 to ensure secure storage. The protruding wall 413 connects with the cord plug opening 412. When the top housing portion and bottom housing portion are enclosed, the protruding wall 413 and the cord plug opening 412 forms the cord plug storage slot 23.

Similarly, a round-shaped protruding wall 414 is located on the bottom side of the top portion 41. It is structured to store the spring-loaded reel assembly 30.

Figure 11:
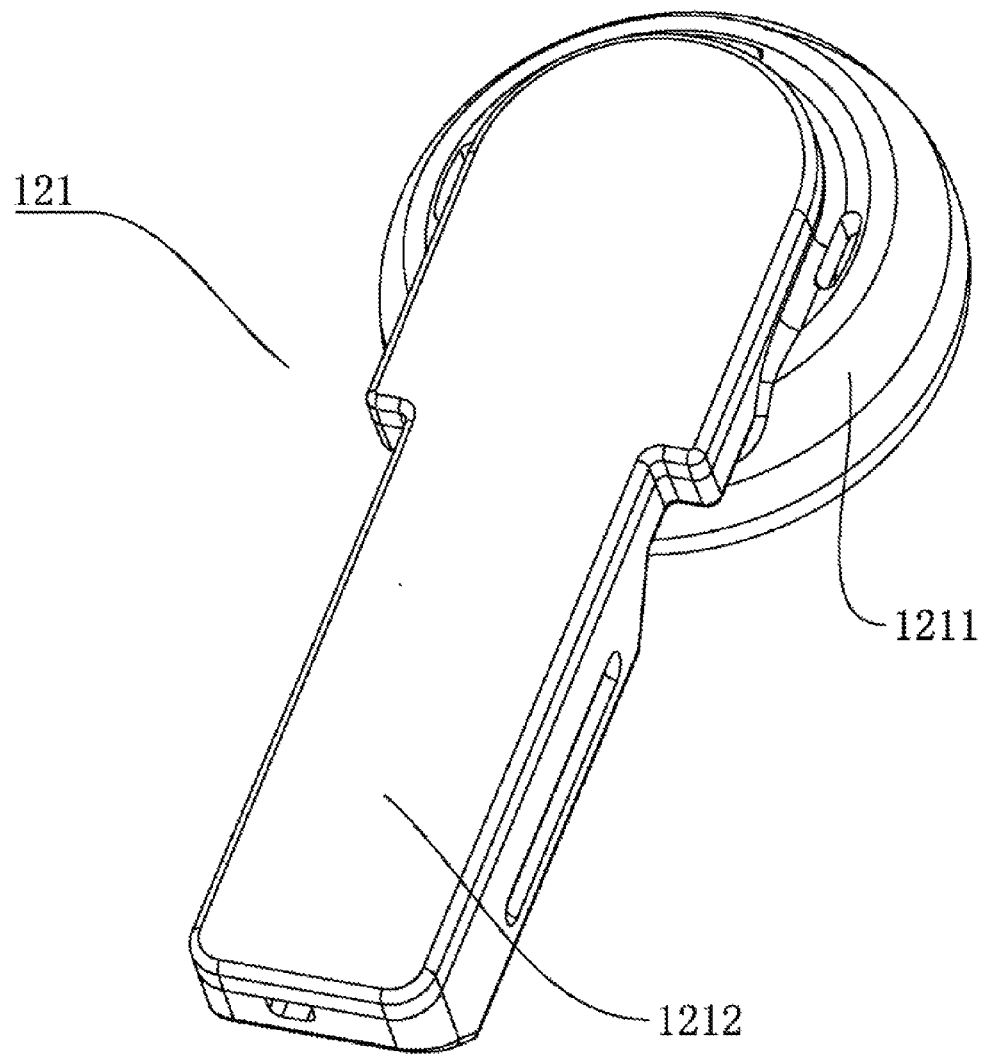
FIG. 11 is the structure diagram of a left earbud of one preferred embodiment.
Figure 12:
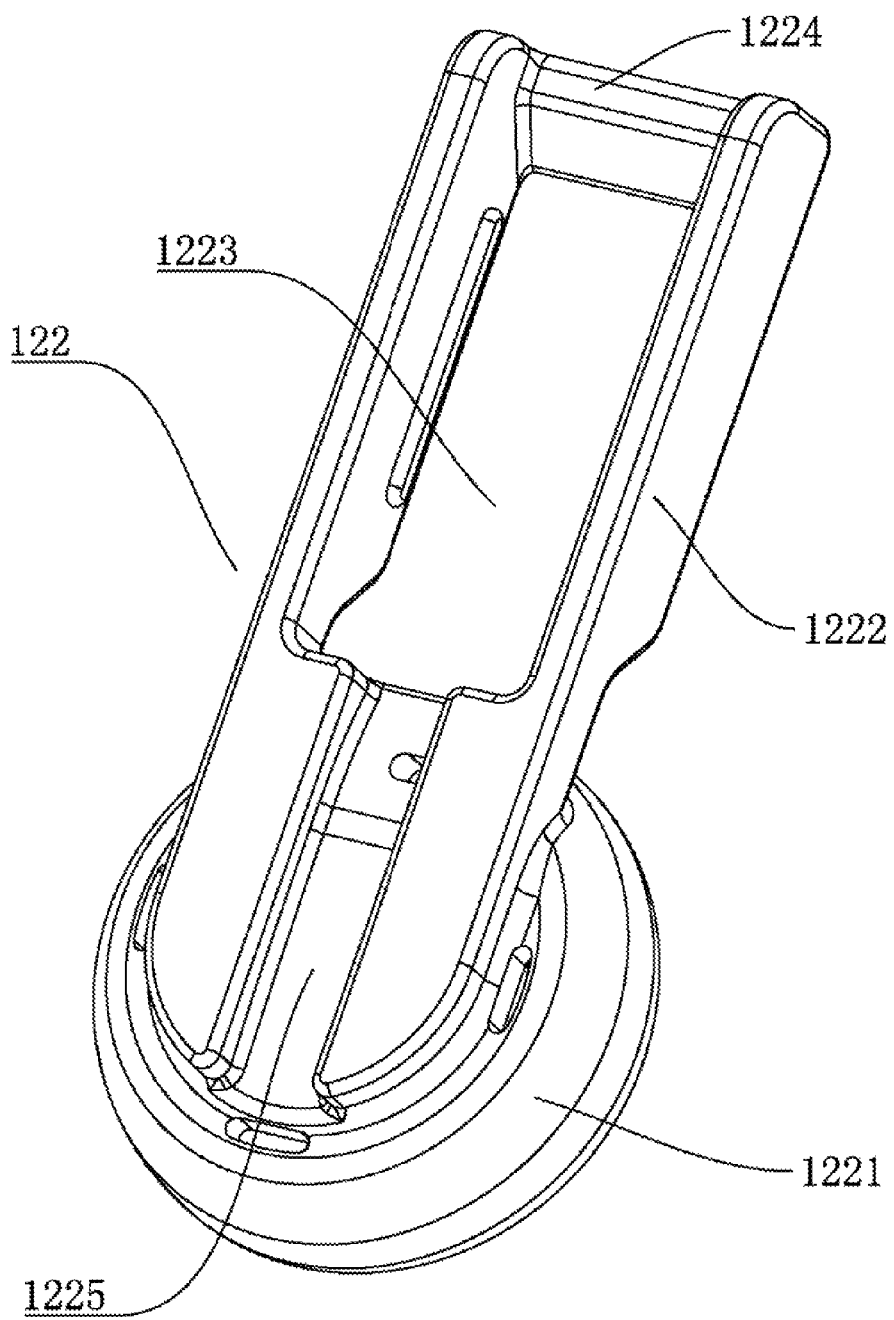
FIG. 12 is the structure diagram of a right earbud of one preferred embodiment.

As shown in FIG. 1, headset 10 includes headset cord 11, earbuds 12, and cord plug 13. FIGS. 11 and 12 depict one embodiment of the earbuds in more details. Earbuds 12 includes a left earbud 121 and right earbud 122. The left and right earbuds are detachably hooked together with substantially flat top and bottom surfaces. The left earbud 121 includes a left earbud receiver 1211 and an earbud base 1212 attached to the back of the left earbud receiver 1211. The right earbud 122 also includes a right earbud receiver 1221 and an earbud base 1222 attached to the back of the right earbud receiver 1221. In this embodiment, the left earbud base 1212 is a flat-shaped plate while the right earbud base 1222 includes a flat-shaped empty frame 1223 that matches the left earbud base so that the two bases can be detachably hooked to form integrated substantially flat structure, which makes it easier to be stored inside the housing. The right earbud base also includes a border barrier 1224 at the side close to the path of the headset cord. The depth of the border substantially matches the thickness of said left earbud base 1212. Therefore, the left earbud base 1212 can be snapped into the right earbud base 1222 so that the outer surface of left earbud base 1212 is at the same level as the outer surface of the right earbud base 1222. The left earbud receiver 1211 and right earbud receiver 1221 are located at the opposite side of the hooked earbuds set. To facilitate the path of the headset cord 11, the outer surface of the right earbud base 1222 further includes a wire groove 1225. The wire groove 1225 further extends through the frame 1223 to the left earbud receiver 1211 so that the headset cord 11 remains below the surfaces while going from the left earbud receiver to the headset cord storage slot 21.

FIGS. 1-10 also depict the various aspects of the spring-loaded, reel assembly 30. It includes a turntable 31 and coil spring 32 for retracting and releasing said headset cord. The turntable 31 is round-shaped and includes an axial hole with a first shaft that is fixed perpendicularly to the inner surface of the top housing portion. It includes a ball track table 311 towards the upper surface of said turntable. A circular ball track groove 312 is located on the other surface of the turntable and includes a rolling ball 313. The rolling ball 313 contacts the top portion of the housing to prevent turntable 31 from rotating. The ball track groove 312 does not have the same depth throughout the whole track, which leads to the tightening and loosening of the ball 313 depending on the depth. Therefore, the movement of the ball controls the automatic releasing and retracting.

The first shaft 425 is fixed perpendicularly to the inner surface of the top or bottom portion of the housing. The turntable further includes an annular ledge 314 on the other surface of said turntable with a coil spring 32 enclosed therein. One end of the coil spring 32 is fixed to first shaft 425 while the other end is linked to the annular ledge 314. The inner end of coil spring 32 is fixed while the outer end is fixed to the turntable. When the turntable 31 rotates, it tightens or loosens the coil spring 32 and changes the tension thereon. The automatic rewinding of coil spring 32 then leads to the automatic retracting of the headset cord.

The annular ledge 314 includes a first hole for said headset cord 11, and there is a second hole located between said annular ledge and ball track table on the turntable 31. The headset cord 11 is wound around the outward wall of the annular ledge 314 and the ball track table 311. The portion of headset cord 11 coming out the earbuds 12 is wound around the annular ledge 314. For convenience, this portion of the headset cord 11 is called the first headset cord 111. The portion of the headset cord closest to the cord plug 13 is wound around the outward wall of the ball track table 311. For convenience, this portion around the ball track table is referred to as the second headset cord 112. The first headset cord 111 and second headset cord 112 go through said first hole and second hole respectively and form the one single headset cord 11.

In order to retract any extra cord after the headset cord plug 13 is unplugged, there is a coil spring 33 and second support pole 34 inside the headset cord storage 21. One end of the coil spring 33 is fixed to the back panel 421 while the other end includes a hook for holding the second headset cord 112. The second support pole 34 is perpendicularly fixed to the back panel 421 and includes a connecting hole extended axially. The top housing portion 41 includes a coupling pole 35, which corresponds to the support poles. Therefore, the coupling pole 35 will be inserted into the connecting hole when the top housing portion 41 and bottom housing portion 42 are snapped together.

In another preferred embodiment, there are two second support poles 34 fixed to the back panel 421, one of which is close to the border frame 422 of the bottom housing 42. The other support pole is located at a distance so that the headset cord 112 will come out of the hook and is tightened after going through the two support poles. With the assistance of coil spring 33, the headset plug 13 can be automatically retracted into the cord plug storage slot 23.

In another preferred embodiment, the outside surface of the back panel 421 includes a foldable kickstand 43. The kickstand 43 in this implementation is a rectangular shape panel. The back panel 421 includes a matching rectangular empty hole. The kickstand 43 is rotatably linked to the shallow hole. When kickstand 43 is folded into the shallow hole, it forms a flat surface with the back panel 421. When needed, one could open the kickstand 43 and form an upside down "V" structure with the back panel 421 so the mobile phone can stand upright at an angle to the ground surface. Additionally, the rectangular hole could help release heat of the mobile phone inside the case when the kickstand 43 is in use. In other embodiments, the kickstand 43 could be simply a foldable kickstand without corresponding structured inside the housing.

Figure 5:
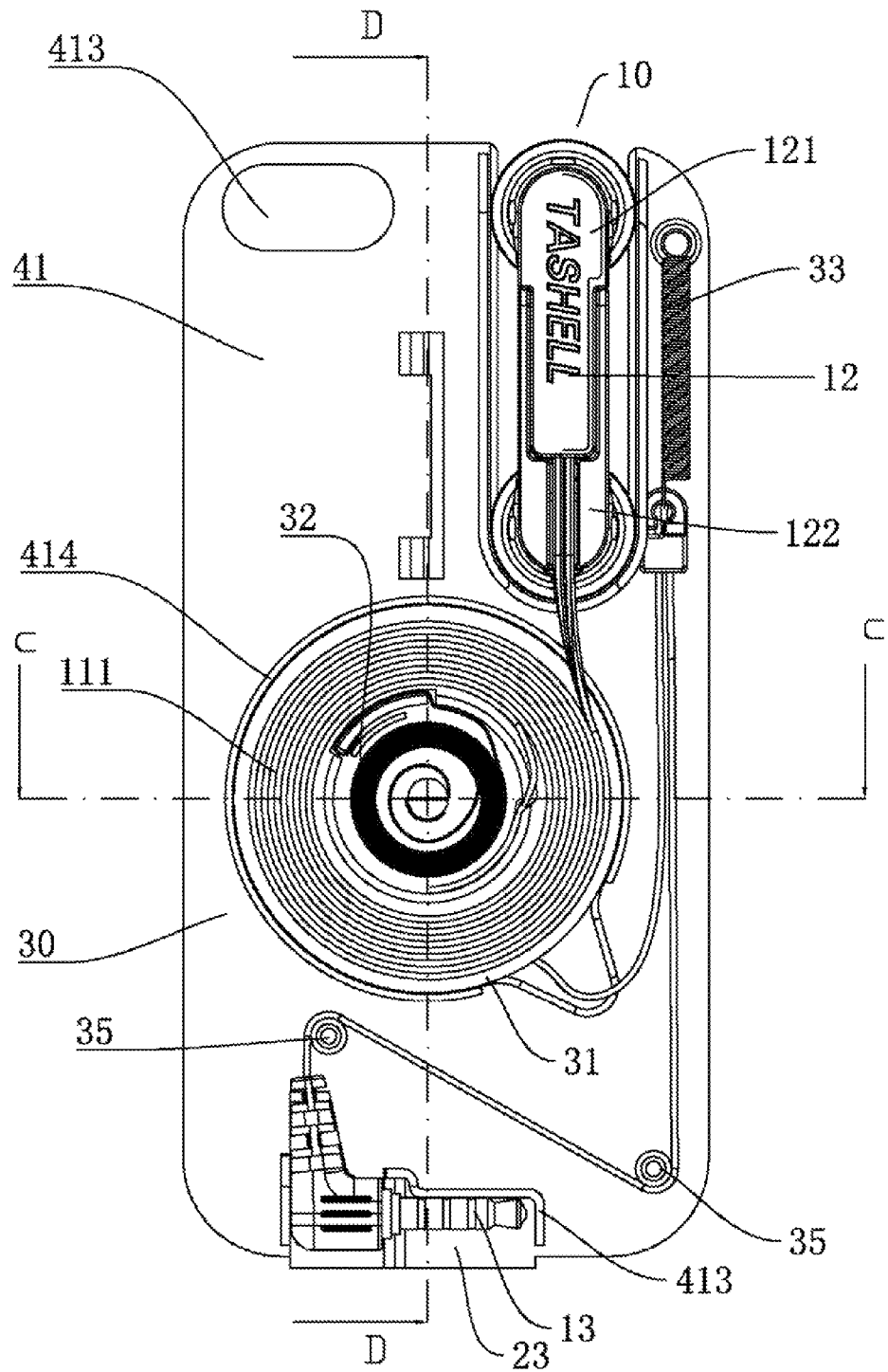
FIG. 5 depicts the cross-section view of the spring loaded reel structure for the cord storage slot in one preferred embodiment of the present inventions.
Figure 6:
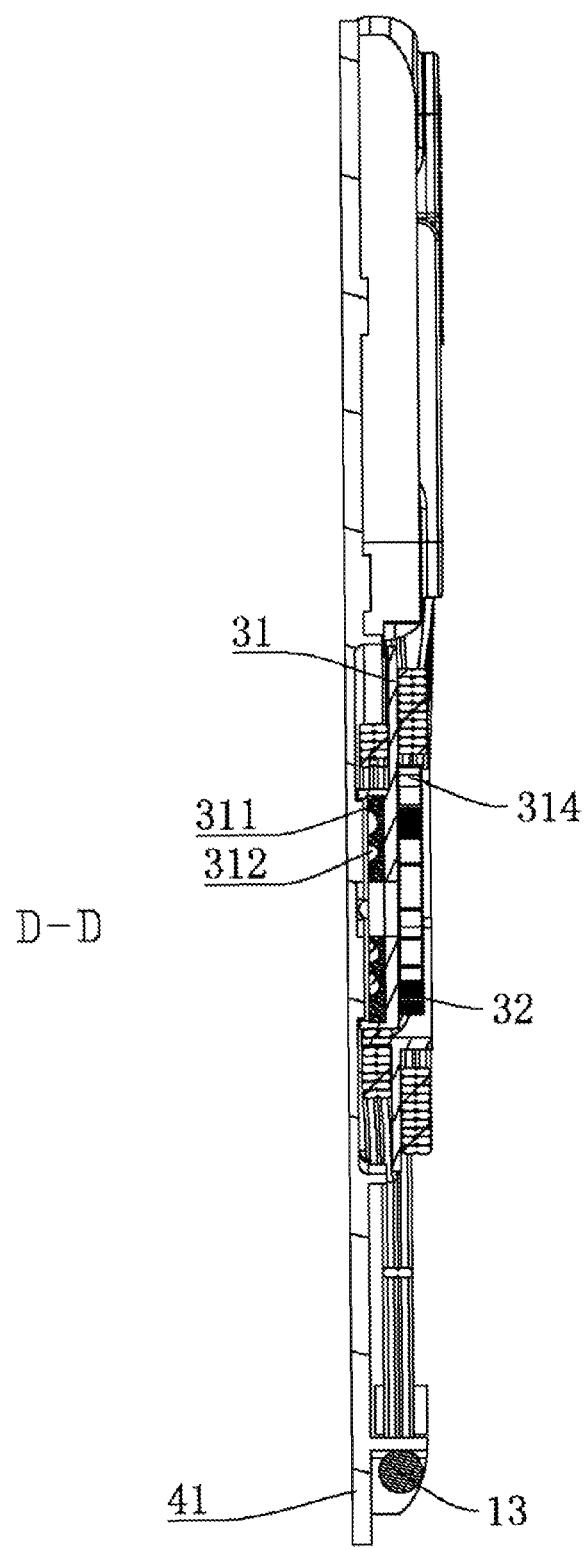
FIG. 6 depicts the cross-section view from the D-D direction as shown in FIG. 5.
Figure 7:
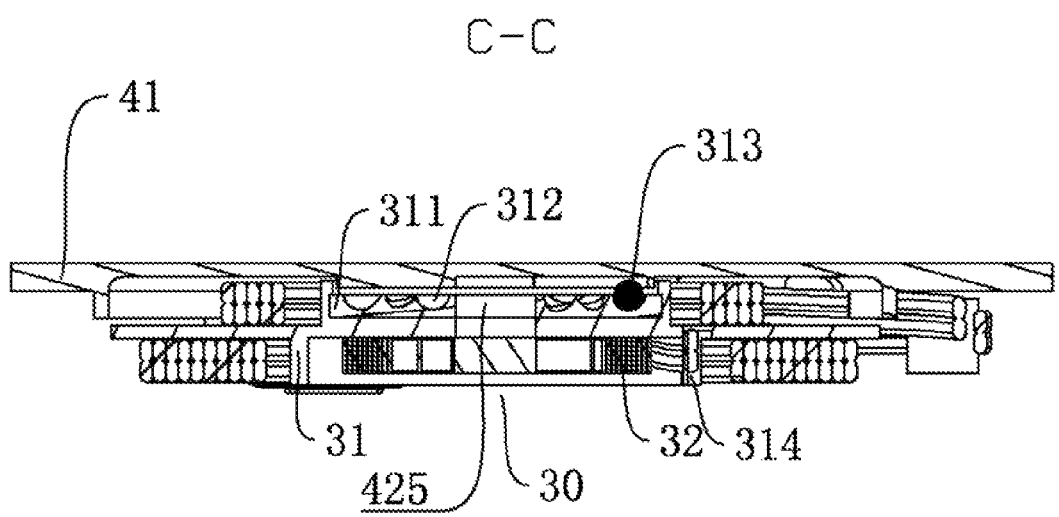
FIG. 7 depicts the cross-section view from the C-C direction as shown in FIG. 5.

In one preferred embodiment, as shown in FIGS. 1 and 5, when the headset 10 is completely stored inside the case housing, the coil spring 32 exerts some pulling, tension to tighten the headset cord 11 so the headset cord plug 13 and earbuds 12 will conic loose and drop out of the case. When the headset 10 is to be used, the user will pull the earbuds 12, first headset cord 111 starts pulling and rotates the turntable 31. The rotation of the turntable 31 will pull the coil spring 32 and increases the tension thereon. When there is no force holding the earbuds, the coil spring 32 will recoil and retract the headset cord. When the outside force rotates the turntable 31, the second headset cord 112 become loose to make it easier to pull out the cord plug 13 for inserting into the plug hole in the mobile phone. When the cord plug 13 is inserted into the mobile phone, the second headset cord 112 automatically retracts because of the tension from coil spring 33. Therefore, any extra cord close to the cord plug 13 will be automatically retracted back into the cord plug storage slot 21. When the earbuds 12 are pulled out for use, its movements and retraction is made possible by the rolling ball 313 between the top housing portion 41 and turntable 31. When the rolling ball 313 is loose, there is no pulling force on the first headset cord 111. The automatic retraction of the coil spring 32 causes the turntable 31 to roll in the opposite direction. Therefore, the first headset cord 111 will be automatically rewound back to the annular ledge 314. When the rolling ball 313 is tightened or fixed, the headset cord is temporarily locked for normal use by the user.

Yet in another embodiment of the present inventions, it includes a portable rechargeable battery and the accompanying charging, cable. The battery is detachably located in the bottom housing portion. The charging cable is connected to the battery at one end and stored at a side slot in the bottom housing portion.

Figure 13:
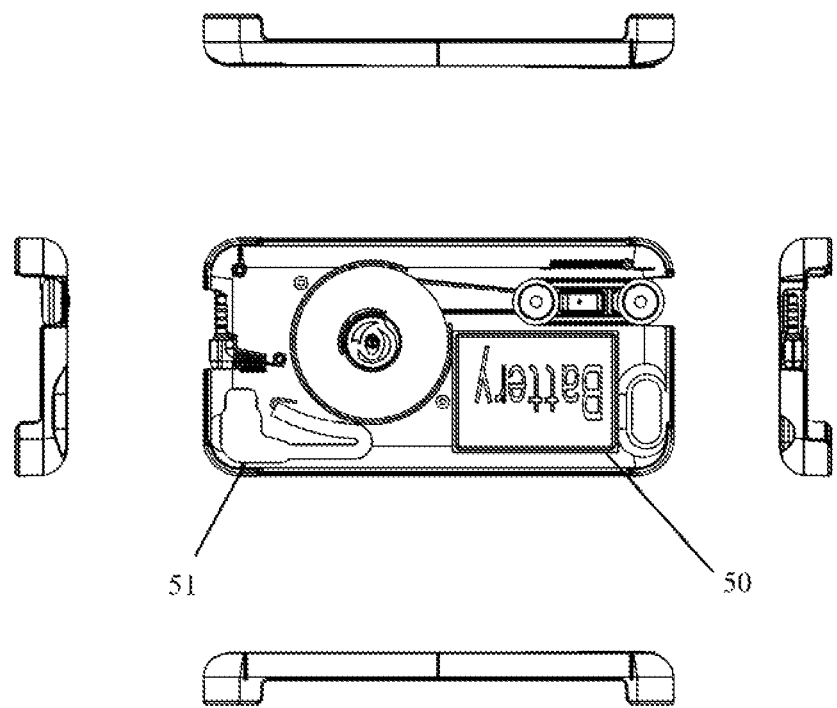
FIG. 13 depicts the overall structure of one preferred embodiment with rechargeable battery and charging cable.

FIG. 13 shows the back and four side-views of the embodiment where a portable rechargeable battery is attached to the back of the housing. The battery can be attached to the back or stored inside the bottom housing portion. A charging cable is connected to the battery at one end, while the other end is stored in the bottom portion of the housing.

Figure 14:
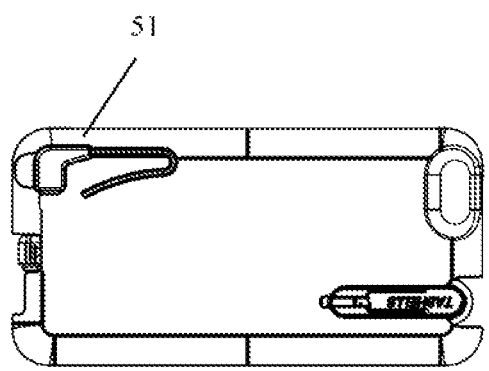
FIG. 14 depicts the front view of one preferred embodiment with rechargeable battery and charging cable.
Figure 15:
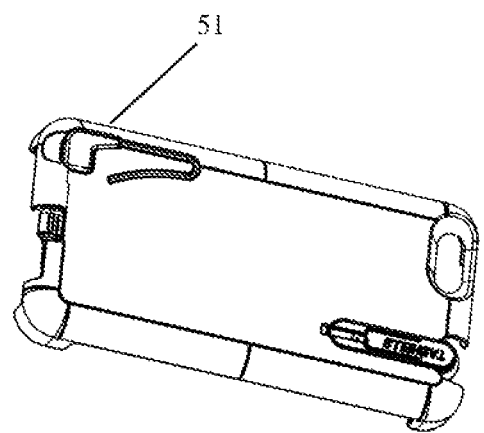
FIG. 15 depicts a 3-D view of the front of one preferred embodiment with rechargeable battery and charging cable.
Figure 16:
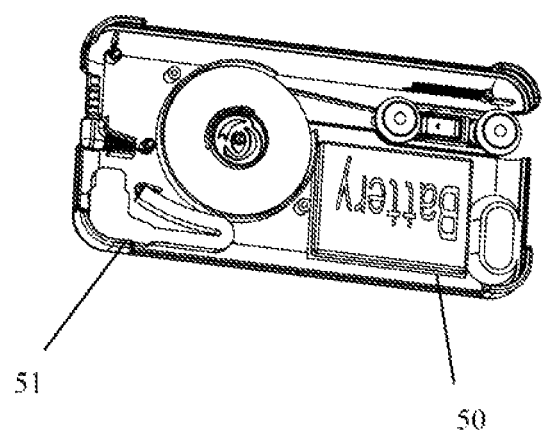
FIG. 16 depicts a 3-D view of the overall structure of one preferred embodiment with rechargeable battery and charging cable.

FIG. 14 shows the front view of one of the embodiment that includes a rechargeable battery and a charging cable. It also illustrates a preferred location where the plug of the charging cable can be stored. FIGS. 15 and 16 are the 3-D views of the front and back of this alternative embodiment of the inventions.

Although exemplary embodiments of the present inventions have been illustrated in the accompanied drawings and described in the foregoing, detailed description, it will be understood that the invention is not limited to the embodiments disclosed, but is capable of numerous rearrangements, modifications, and substitutions without departing from the spirit of the invention as set forth and defined by the following claims.

What is claimed is:

1. A case for a mobile phone with a retractable headset integrated thereof comprising:
    a removable housing;

a headset with two earbuds, a cord with a pair of free ends and a plug;

wherein said housing further comprising:

a wire storage slot for said earbud cord and said wire storage slot including a spring-loaded reel for automatic retracting of the cord when not used;

an earbud storage slot with an opening at one edge of the housing for storing said earbuds;

a plug storage slot with an opening at another edge of the housing for storing the plug close to the headset jack of a mobile phone, and said wire storage slot, earbud storage slot, and plug storage slot are interconnected via, said headset cord; and a plurality of wheels for routing the cord through said earbud storage slot, wire storage slot, and plug storage slot;

wherein said headset is integrated with said housing with earbuds retractably stored in said earbud storage slot and said headset cord stored in said wire storage slot and plug storage slot; and wherein said two earbuds include a left earbud and a right earbud, and both can be detachably hooked together with substantially flat top and bottom surfaces.

2. A case for a mobile phone with a retractable headset integrated thereof comprising:

a removable housing;

a headset with two earbuds, a cord with a pair of free ends and a plug;

wherein said housing further comprising:

a wire storage slot for said earbud cord and said wire storage slot including a spring-loaded reel for automatic retracting of the cord when not used;

an earbud storage slot with an opening at one edge of the housing for storing said earbuds;

a plug storage slot with an opening at another edge of the housing for storing the plug close to the headset jack of a mobile phone, and said wire storage slot, earbud storage slot, and plug storage slot are interconnected via said headset cord; and a plurality of wheels for routing the cord through said earbud storage slot, wire storage slot, and plug storage slot;

wherein said headset is integrated with said housing with earbuds retractably stored in said earbud storage slot and said headset cord stored in said wire storage slot and plug storage slot; and wherein each earbud includes a receiver and a base; and one base is a flat-shaped plate while the other base is a flat-shaped frame that matches said plate so that the two bases can be detachably hooked together to form an integrated flat top and bottom surface.

3. A case for a mobile phone with a retractable headset integrated thereof comprising:

a removable housing;

a headset with two earbuds, a cord with a pair of free ends and a plug;

wherein said housing further comprising:

a wire storage slot for said earbud cord and said wire storage slot including a spring-loaded reel for automatic retracting of the cord when not used;

an earbud storage slot with an opening at one edge of the housing for storing said earbuds;

a plug storage slot with an opening at another edge of the housing for storing the plug close to the headset jack of a mobile phone, and said wire storage slot, earbud storage slot, and plug storage slot are interconnected via said headset cord; and a plurality of wheels for routine the cord through said earbud storage slot, wire storage slot, and plug storage slot;

wherein said headset is integrated with said housing with earbuds retractably stored in said earbud storage slot and said headset cord stored in said wire storage slot and plug storage slot;

wherein said housing is a removable mobile phone case having a top and bottom housing portions that attach and detach from one another to form an enclosure;

Wherein the top housing portion includes protruding walls that match the shape of a mobile phone;

wherein said wire storage slot is located close to the center of the enclosure between the top and bottom housing portions;

wherein said earbud storage slot is compatible with the shape of the earbud and said plug storage slot is compatible with the shape of said headset plug;

wherein spring-loaded reel includes a turntable and coil spring for retracting and releasing said headset cord;

said turntable is fixed to the inner surface of said top and bottom housing portions and said coil spring is fixed to said turntable;

said headset cord is wound around said turntable for retracting and releasing; and said coil spring tightens or relaxes as the turntable rotates.

4. The mobile phone case of claim 3 wherein said turntable is round-shaped and includes an axial hole with a first shaft wherein said first shaft is fixed perpendicularly to the inner surface of said top and bottom housing portions;

Wherein said turntable includes a ball track table towards the upper surface of said turntable with a ball track groove and a rolling ball contained therein; and Said turntable further includes an annular ledge on the other surface of said turntable with a coil spring enclosed therein.

5. The mobile phone case of claim 4 wherein said annular ledge includes a first hole for holding said headset cord, and a second hole located between said annular ledge and ball track table on said turntable.

6. The mobile phone case of claim 5 further comprising a foldable kickstand attached to said back housing portion.

7. A case for a mobile phone with a retractable headset and a rechargeable battery integrated thereof comprising:

a removable housing;

a headset with two earbuds, a cord with a pair of free ends, and a plug;

a rechargeable battery attached to or stored in said housing;

a charging cable stored in said housing and connected with said rechargeable battery;

wherein said housing further comprising:

a wire storage slot for said earbud cord, and said wire storage slot include a spring-loaded reel for automatic retracting of the cord when not used;

an earbud storage slot with an opening at one edge of the housing for storing said earbuds;

a plug storage slot with an opening at another edge of the housing for storing the plug close to the headset jack of a mobile phone; and said wire storage slot, earbud storage slot, and plug storage slot are interconnected via said headset cord;

a plurality of wheels for routine the cord through said earbud storage slot, wire storage slot, and plug storage slot;

wherein said headset is integrated with said housing with earbuds retractably stored in said earbud storage slot and said headset cord stored in said wire storage slot and plug storage slot; and wherein said two earbuds includes a left earbud and a right earbud, and both are detachably hooked together with flat top and bottom surfaces.

8. A case for a mobile phone with a retractable headset and a rechargeable battery integrated thereof comprising:
  a removable housing;
  a headset with two earbuds, a cord with a pair of free ends, and a plug;
  a rechargeable battery attached to or stored in said housing;
  a charging cable stored in said housing and connected with said rechargeable battery;
  wherein said housing further comprising:
    a wire storage slot for said earbud cord, and said wire storage slot include a swing-loaded reel for automatic retracting of the cord when not used;
    an earbud storage slot with an opening at one edge of the housing for storing said earbuds;
    a plug storage slot with an opening at another edge of the housing for storing the plug close to the headset jack of a mobile phone; and
    said wire storage slot, earbud storage slot, and plug storage slot are interconnected via said headset cord;
    a plurality of wheels for routing the cord through said earbud storage slot, wire storage slot, and plug storage slot;
  wherein said headset is integrated with said housing with earbuds retractably stored in said earbud storage slot and said headset cord stored in said wire storage slot and plug storage slot; and
  wherein each earbud includes a receiver and a base; and one base is a flat-shaped plate while the other base is a flat-shaped frame that matches said plate so that the two bases can be detachably hooked together to form a substantial flat top and bottom surface.

9. A case for a mobile phone with a retractable headset and a rechargeable battery integrated thereof comprising:
  a removable housing;
  a headset with two earbuds, a cord with a pair of free ends, and a plug;
  a rechargeable battery attached to or stored in said housing;
  a charging cable stored in said housing and connected with said rechargeable battery;
  wherein said housing further comprising:
    a wire storage slot for said earbud cord, and said wire storage slot include a spring-loaded reel for automatic retracting of the cord when not used;
    an earbud storage slot with an opening at one edge of the housing for storing said earbuds;
    a plug storage slot with an opening at another edge of the housing for storing the plug close to the headset jack of a mobile phone; and
    said wire storage slot, earbud storage slot, and plug storage slot are interconnected via said headset cord;
    a plurality of wheels for routing the cord through said earbud storage slot, wire storage slot, and plug storage slot;
  wherein said headset is integrated with said housing with earbuds retractably stored in said earbud storage slot and said headset cord stored in said wire storage slot and plug storage slot;
  wherein said housing is a removable mobile phone case having a top and a bottom housing portions that attaches and detach from one another to form an enclosure;
  Wherein the top housing portion includes protruding walls that match the shape of a mobile phone;
  wherein said wire storage slot is located close to the center of the enclosure between the top and bottom housing portions;
  wherein said earbud storage slot is compatible with the shape of the earbud and said plug storage slot is compatible with the shape of said headset plug;
  wherein spring-loaded reel includes a turntable and coil spring for retracting and releasing said headset cord;
  said turntable is fixed to the inner surface of said top and bottom housing portions and said coil spring is fixed to said turntable;
  said headset cord are wound around said turntable for retracting and releasing; and
  said coil spring tightens or relaxes as the turntable rotates.

10. The mobile phone case of claim 9 wherein said turntable is round-shaped and includes an axial hole with a first shaft wherein said first shaft is fixed perpendicularly to the inner surface of said top and bottom portions of the case;
  Wherein said turntable includes a ball track table towards the upper surface of said turntable, a ball track groove and a ball contained therein; and
  Said turntable further includes an annular ledge on the other surface of said turntable with a coil spring enclosed therein.

11. The mobile phone case of claim 10 wherein said annular ledge includes a first hole for holding said headset cord, and a second hole located between said annular ledge and ball track table on said turntable.

12. The mobile phone case of claim 11 further comprising a foldable kickstand attached to the outside surface of said back housing portion.

* * * * *